US009550444B1

(12) United States Patent
Ferreira

(10) Patent No.: US 9,550,444 B1
(45) Date of Patent: Jan. 24, 2017

(54) LIFT SYSTEM

(71) Applicant: Armando Ferreira, La Mirada, CA (US)

(72) Inventor: Armando Ferreira, La Mirada, CA (US)

( * ) Notice: Subject to any disclaimer, the term of this patent is extended or adjusted under 35 U.S.C. 154(b) by 0 days.

(21) Appl. No.: 15/043,169

(22) Filed: Feb. 12, 2016

Related U.S. Application Data

(60) Provisional application No. 62/237,406, filed on Oct. 5, 2015.

(51) Int. Cl.
*B60P 9/00* (2006.01)
*B60P 3/077* (2006.01)
*B60R 9/06* (2006.01)

(52) U.S. Cl.
CPC . *B60P 3/077* (2013.01); *B60R 9/06* (2013.01)

(58) Field of Classification Search
CPC .............. B60P 3/07; B60P 3/077; B60R 9/06; B60R 9/10; B60R 9/042; B60R 9/045; B60R 19/48
USPC ......... 414/462–466, 540; 224/400, 412, 413, 224/428, 484, 486, 487, 488, 500, 511, 224/518, 519, 522, 524, 525, 533, 537, 224/545, 571, 924
See application file for complete search history.

(56) References Cited

U.S. PATENT DOCUMENTS

| | | | |
|---|---|---|---|
| 3,528,578 A * | 9/1970 | Schoenberger ........... | B60R 9/06 224/492 |
| 4,775,282 A * | 10/1988 | Van Vliet ............. | A61G 3/0209 224/519 |
| 4,915,276 A * | 4/1990 | Devito ....................... | B60R 9/06 224/500 |
| 5,899,655 A * | 5/1999 | Miller ....................... | B60P 3/07 224/510 |
| 5,984,613 A * | 11/1999 | Motilewa .................. | B60R 9/06 224/519 |
| 6,095,731 A * | 8/2000 | Minakami ............... | B60P 3/075 410/10 |
| 6,390,343 B1 * | 5/2002 | Jain ........................... | B60R 9/06 224/504 |
| 6,755,599 B1 * | 6/2004 | Plyler ..................... | B60P 3/077 211/21 |
| 7,500,639 B2 * | 3/2009 | Mastrolia ............. | B60N 2/0232 244/122 A |
| 2003/0099531 A1 * | 5/2003 | Williams .................. | B60P 3/07 414/462 |
| 2005/0092799 A1 * | 5/2005 | Morris ...................... | B60R 9/06 224/484 |
| 2006/0151556 A1 * | 7/2006 | Eby .......................... | B60R 9/06 224/519 |

(Continued)

*Primary Examiner* — Michael McCullough
*Assistant Examiner* — Lynn Schwenning
(74) *Attorney, Agent, or Firm* — Cislo & Thomas, LLP

(57) ABSTRACT

A lift system that is attachable to a vehicle, such as a car, truck, van, and the like, for lifting and carrying heavy items, such as a motorcycle utilizing a platform connected to a lifting mechanism that is connected to the vehicle. The lifting mechanism has a pair of lift arm housings that are connected to the vehicle, a pair of lift arms connected to the platform that rises up and down within their respective lift arm housing, and an electric motor to raise and lower the lift arms. The platform can be removed from the lift arms and stored away or used as a tabletop by. Wheels may be provided to easily maneuver the platform on the ground. Elongated posts can be attached to the platform to function as braces to secure the item to the platform. The elongated posts can also be used as legs for the tabletop.

22 Claims, 9 Drawing Sheets

(56) References Cited

U.S. PATENT DOCUMENTS

| | | | | |
|---|---|---|---|---|
| 2007/0122259 A1* | 5/2007 | McGrath | ................... | B60P 3/07 |
| | | | | 414/538 |
| 2008/0206030 A1* | 8/2008 | Reuille | ................ | B60P 1/4421 |
| | | | | 414/462 |
| 2009/0152314 A1* | 6/2009 | Myrex | ................... | B60R 9/065 |
| | | | | 224/502 |
| 2009/0232628 A1* | 9/2009 | Miller | .................... | B60P 3/077 |
| | | | | 414/462 |
| 2010/0294819 A1* | 11/2010 | Spera | ....................... | B60R 9/06 |
| | | | | 224/519 |
| 2013/0149083 A1* | 6/2013 | Derrick | .................... | B60P 3/07 |
| | | | | 414/462 |
| 2013/0181023 A1* | 7/2013 | Shawanda | ................ | B66D 1/00 |
| | | | | 224/403 |

* cited by examiner

LIFT SYSTEM

CROSS-REFERENCE TO RELATED APPLICATION

This patent application claims the benefit of U.S. Provisional Patent Application Ser. No. 62/237,406, titled "Motorcycle Lift System for Pickup Trucks," filed Oct. 5, 2015, which application is incorporated in its entirety here by this reference.

TECHNICAL FIELD

This invention relates to a lift system to attach to vehicles.

BACKGROUND

Oftentimes motorcyclists want to be able to transport their motorcycles from one location to another location without having to ride the motorcycle. Some motorcyclists, if they have a truck large enough, will mount their motorcycles in the bed of their trucks. Others will have to purchase a trailer and tow their motorcycles to the desired destinations.

Mounting motorcycles in the bed of a truck eliminates a significant amount of additional space in the truck that can be used to carry other equipment, tools, accessories, necessities, and the like. In addition, it can be dangerous to try to ride or push the motorcycle up a ramp to get the motorcycle into the bed of the truck.

The trailer takes up a significant amount of additional space at the home. In addition, moving the trailer around can be cumbersome.

For the foregoing reasons there is a need for a lift system that does not consume a significant amount of space in the vehicle, is easy to use, and easy to store.

SUMMARY

The present invention is directed to a lift system for lifting and towing a heavy item, such as a motorcycle, on a vehicle. The lift system comprises a platform upon which the item is placed and a lifting mechanism removably attached to the platform. Receivers are mounted on the underside of the vehicle and the lift mechanism is removably attached to the receiver.

The lifting mechanism comprises a lift arm operatively connected to the proximal side of the platform, a lift arm housing operatively connected to the lift arm, a horizontal bar operatively connected to the lift arm housing adjacent the bottom end, a lift device housed inside the lift arm housing and operatively connected to the lift arm, and a motor operatively connected to the lift device to cause the lift arm to slide in and out of the lift arm housing.

The lift system may also comprise a plurality of elongated posts attachable to the platform. The elongated posts can be used to maneuver the platform, secure the item, or used as legs to convert the platform into a tabletop for easy storage and additional use.

Wheels can be attached to the platform for easy maneuverability. Therefore, in use, a motorcycle can easily be placed on top of the platform placed on the ground. The platform can be wheeled to the vehicle with the motorcycle mounted on top of the platform. The horizontal bars can be inserted into the receiver mounted on the vehicle. Actuating the motor will cause the lift arms to rise inside the lift arm housing, thereby lifting the motorcycle on the ground. Electrical wiring can be connected to the lift mechanism so that the life of the vehicle are transferred to lights on the platform.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The present invention is directed towards a lift system 100 that is attachable to a vehicle 10, such as a car, truck, van, and the like. The lift system 100 is designed to lift a variety of different types of items, but is particularly useful for lifting heavy items. In particular, the lift system 100 of the present invention can lift items in excess of 300 pounds. For example, the lift system 100 of the present invention can lift a full-sized motorcycle 12.

Figure 1:
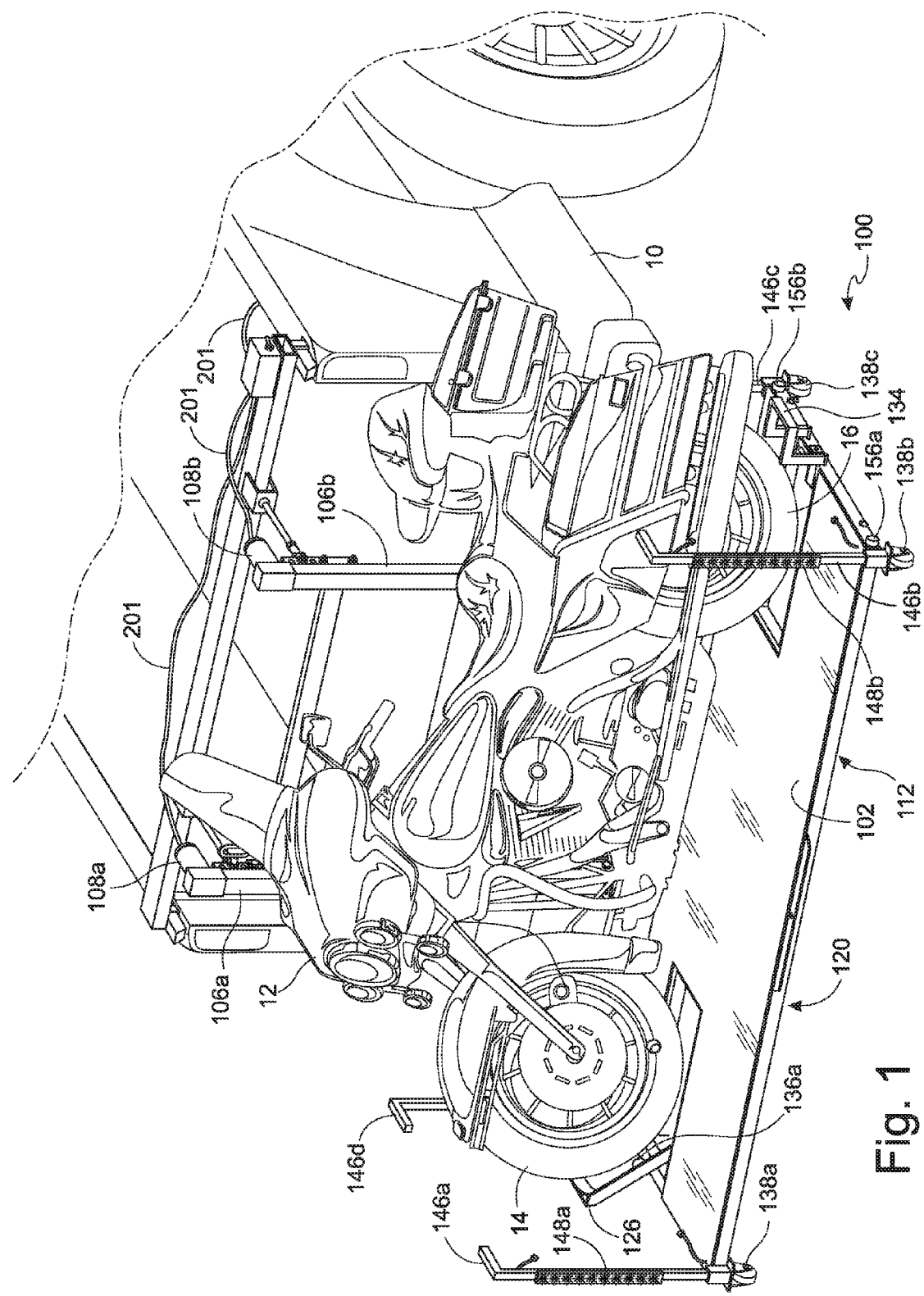
FIG. 1 shows a perspective view of an embodiment of the present invention carrying a motorcycle and mounted on a truck.
Figure 2:
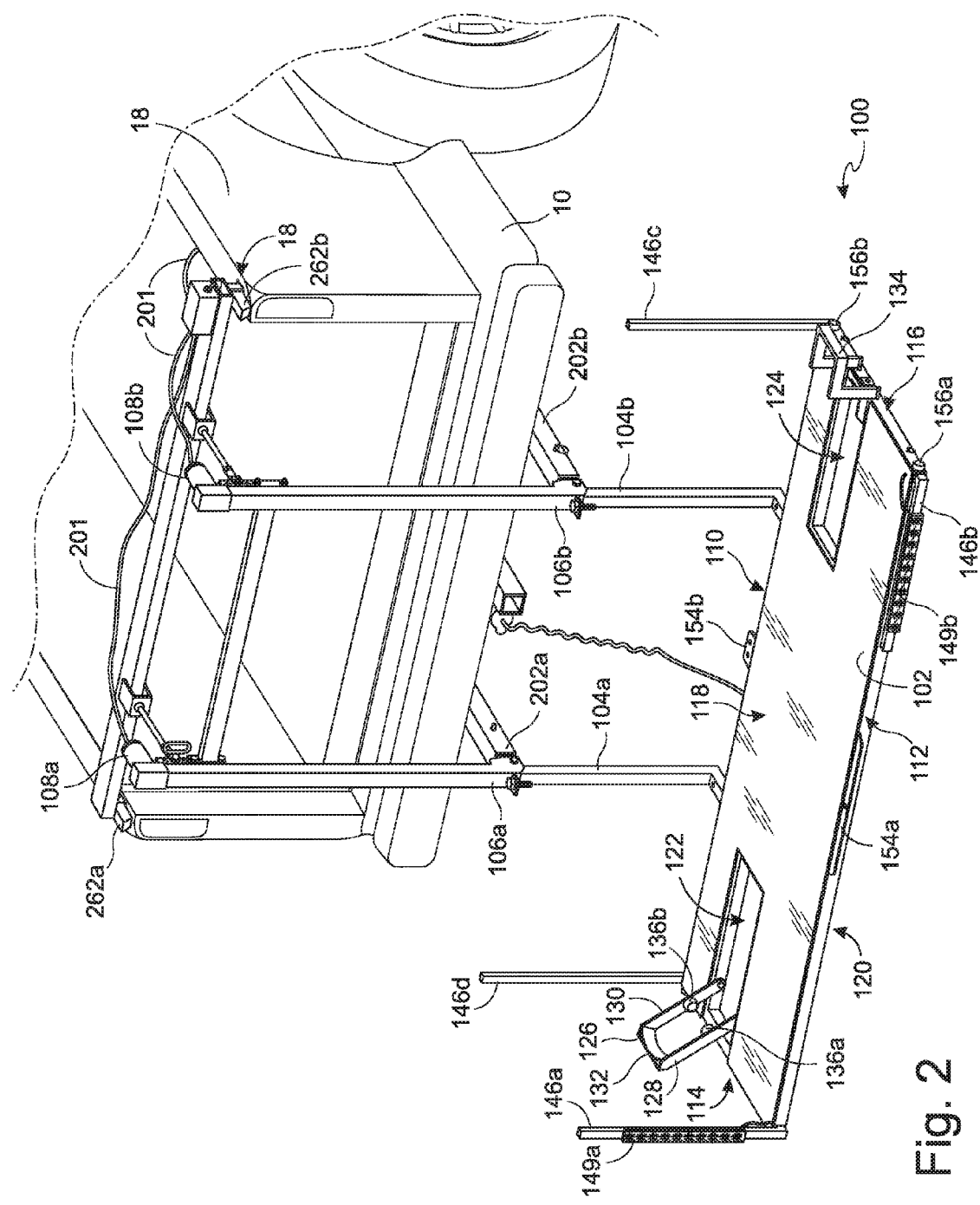
FIG. 2 shows a perspective view of an embodiment of the present invention installed on a truck.
Figure 3:
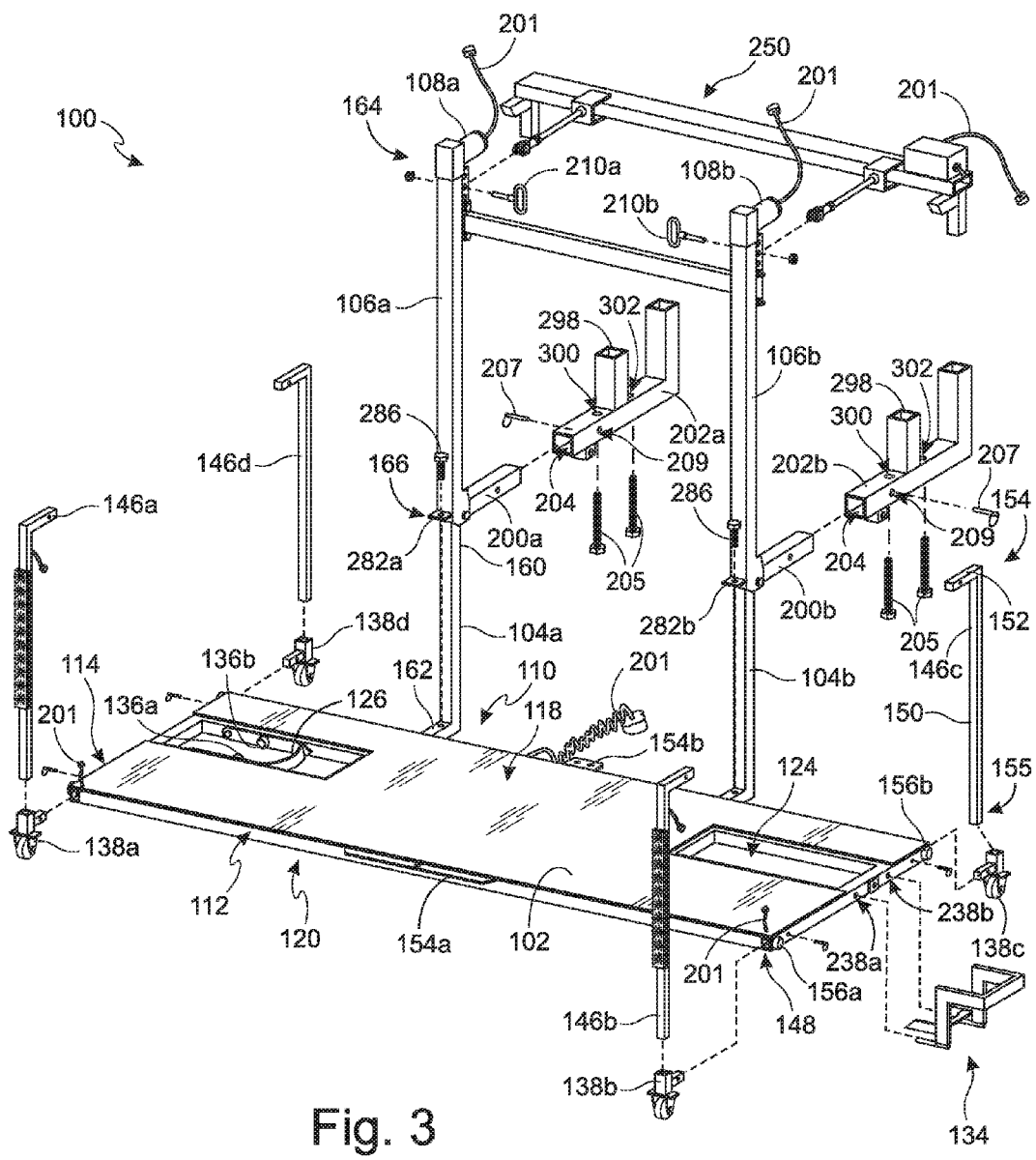
FIG. 3 shows an exploded view of an embodiment of the present invention.

With reference to FIGS. 1-3, in the preferred embodiment, the lift system 100 comprises a platform 102 upon which the item can be mounted, a pair of lift arms 104a, 104b attached to the platform 102, a pair of lift arm housings 106a, 106b attachable to a structure, such as a vehicle 10 (car, truck, van, minivan, etc.), wall frame, stand, and the like, each lift arm housing 106a, 106b operatively connected to one of the lift arms 104a, 104b allowing the lift arms 104a, 104b to be lifted in an out of their respective lift arm housings 106a, 106b using one or more electric motors 108a, 108b. In some embodiments, the lift system 100 may utilize a single lift arm 104 with one lift arm housing 106 centrally located in between the vehicle, and one electric motor 108 to perform its function. Alternatively, multiple lift arms 104, lift arm housings 106, and electric motors 108 can also be used, each strategically located to maximize power and stability.

The platform 102 comprises a proximal side 110, a distal side 112 opposite the proximal side 110, a first lateral side 114 adjacent to the proximal side 110 and the distal side 112, a second lateral side 116 opposite the first lateral side 114 and adjacent to the proximal side 110 and the distal side 112, a top surface 118 bound by the proximal side 110, the distal side 112, and the first and second lateral sides 114, 116, and a bottom surface 120 opposite the top surface 118, and bound by the proximal side 110, the distal side 112, and the first and second lateral sides 114, 116.

The top surface 118 comprises a first recessed portion 122 adjacent to the first lateral side 114 and a second recess portion 124 adjacent to the second lateral side 116. The recessed portions 122, 124 create obstructions that help keep the item on the platform 102. For example, the recessed portions 122, 124 can prevent items with wheels, such as a motorcycle or bicycle, from rolling around excessively while mounted on the platform 102. In the preferred embodiment, the front wheel 14 of a motorcycle 12 may be placed within the first recessed portion 122 and the back wheel 16 of the motorcycle 12 may be placed in the second recessed portion 124 to obstruct the motorcycle 12 from rolling forward or backward while on the platform 102.

In some embodiments, a retractable wheel chock 126 may be attached to the platform 102 in the first or second recessed portions 122, 124. The retractable wheel chock 126 may have a stowed configuration in which the chock 126 is generally flush with the top surface 118 of the platform 102 as shown in FIG. 3, and a deployed configuration in which the chock 126 protrudes above the top surface 118 of the platform 102, as shown in FIGS. 1 and 2. In the preferred embodiment, the retractable chock 126 may have a U-shaped configuration defined by a pair of bars 128, 130 parallel to each other. Each bar 128, 130 may have a free end and a connected end. The connected ends of each bar may be connected to each other by a crossbar 132. The free ends of the bars 128, 130 are rotatably connected to the platform 102 inside the first or second recessed portion 122, 124 in which the retractable wheel chock 126 resides. If the user does not want to use the chock 126, the chock 126 can be placed in its stowed configuration or removed.

In the preferred embodiment, only a single chock 126 is used. If the user wants to improve the securement of the motorcycle 12 on the platform 102, the chock 126 can be in the deployed configuration in which case the chock 126 protrudes out from the recessed portion 122 and above the top surface 118 of the platform 102. Preferably, the chock 126 is angled towards the lateral side 114 to which it is adjacent allowing the chock 126 to create an angled barricade having an opening therethrough. In this example, the bottom portion of the front wheel 14 can then reside in the first recessed portion 122 while the front portion of the motorcycle wheel 14 abuts against the chock 126, as shown in FIG. 1. This further decreases the chances that the motorcycle 12 will roll forward and off the platform 102. To further secure the rear wheel 16, a gooseneck frame 134 may be attached to the lateral side 116 opposite the chock 126.

Figure 4:
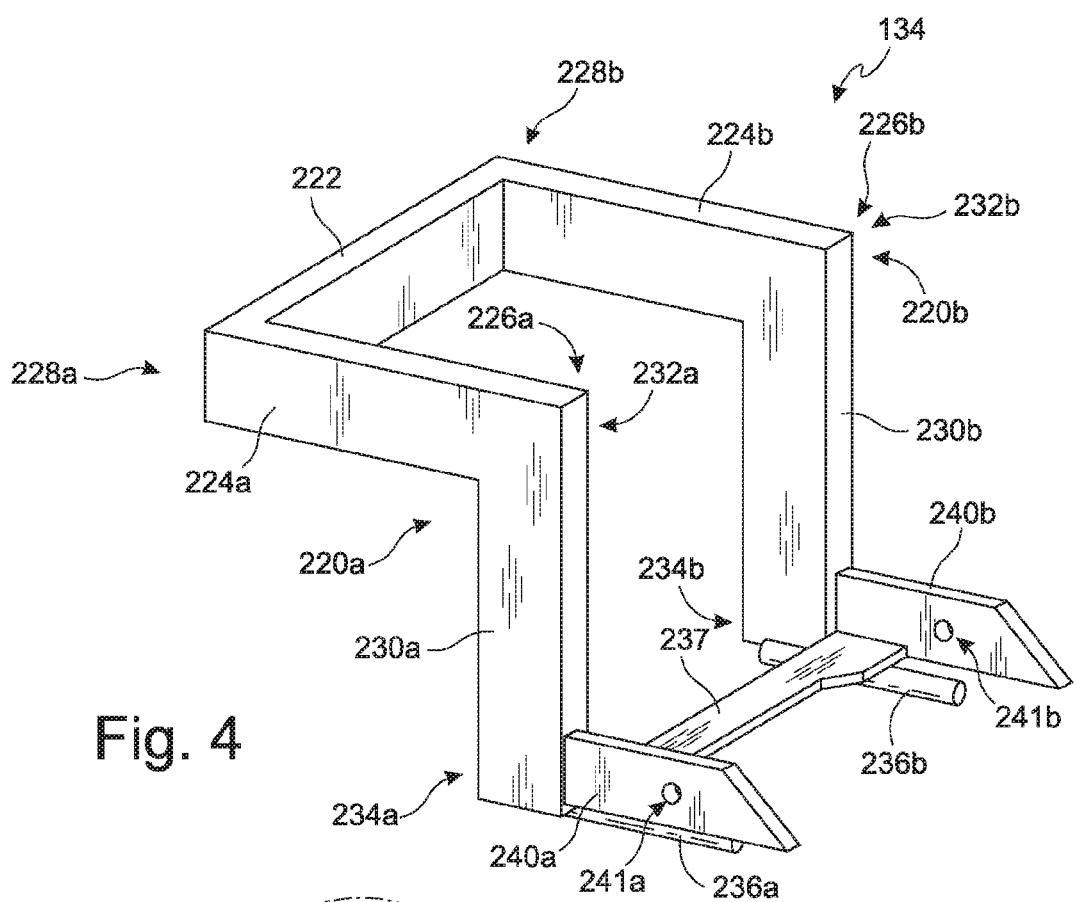
FIG. 4 shows a perspective view of an embodiment of the gooseneck frame.

The gooseneck frame 134 is designed for a dual purpose. First, the gooseneck frame 134 can be used to secure the rear wheel 16 of a motorcycle 12 mounted on the platform 102. Second, the gooseneck frame 134 provides a stable support for use with a jack to lift the platform 102 off of the ground to make certain adjustments, such as adding or removing the wheels 138a-d. As shown in FIG. 4, the gooseneck frame 134 comprises a pair of elbow frames 220a, 220b parallel and spaced apart from each other connected to each other by a cross arm 222. The space in between the pair of elbow frames 220a, 220b is sufficiently wide to receive the rear wheel 16 of a motorcycle 12. Each elbow frame 220a, 220b has a first arm 224a, 224b having a first end 226a, 226b and a second end 228a, 228b, and a second arm 230a, 230b having a first end 232a, 232b and a second end 234a, 234b, wherein the first ends 226a, 232a of the first and second arms 224a, 230a, respectively, of the first elbow frame 220a are connected to each other so that the first arm 224a and the second arm 230a form approximately a right angle; and the first ends 226b, 232b of the first and second arms 224b, 230b, respectively, of the second elbow frame 220b are connected to each other so that the first arm 224b and the second arm 230b form approximately a right angle. The cross arm 222 attaches the second ends 228a, 228b of the first arms 224a, 224b of the first and second elbow frames 220a, 220b, respectively, together. Each of the second arms 230a, 230b comprises a peg 236a, 236b projecting perpendicularly from its respective second arm 230a, 230b at the respective second ends 234a, 234b in a direction opposite the first arms 224a, 224b. Alternatively, the one or more pegs 236a, 236b may project from a second cross arm 237 attached to the second ends 234a, 234b of the second arms 230a, 230b.

One of the lateral sides (e.g. lateral side 116) of the platform 102 may comprise one or more holes 238a, 238b into which the pegs 236a, 236b can be inserted. If the gooseneck frame 134 has more than one peg 236a, 236b, then the holes 238a, 238b are spaced apart the distance equivalent of the space in between the pegs 236a, 236b. On each of the second arms 230a, 230b of each elbow frame 220a, 220b, in between the pegs 236a, 236b and the first ends 232a, 232b, may be support bars 240a, 240b projecting parallel to and in the same direction as the pegs 236a, 236b. The distance between the pegs 236a, 236b and its respective support bar 240a, 240b is sufficient to allow the support bars 240a, 240b to rest on top of the top surface 118 of the platform 102 when the pegs 236a, 236b are inserted into the holes 238a, 238b. In the preferred embodiment, the support bars 240a, 240b are spaced apart from each other and from their respective pegs 236a, 236b so as to rest within the recessed portion 124 of the platform 102. Additional holes 241a, 241b may be provided on the support bars 240a, 240b to allow fasteners to be inserted through holes 241a, 241b and into the walls defining the recessed portion 124 so as to lock the gooseneck frame 134 onto the platform 102. Therefore, when the gooseneck frame 134 is viewed from the side (i.e. profile view), the gooseneck frame has a zig-zag profile.

In use, the platform 102 may be resting on the floor without the gooseneck frame 134 installed. A motorcycle 12 can be loaded onto the platform 102. The gooseneck frame 134 can be installed onto the lateral side 116 of the platform 102 adjacent to the rear wheel 16 of the motorcycle 12. A jack can be placed underneath the first arms 224a, 224b of the elbow frames 220a, 220b to lift the platform 102. Once sufficiently lifted, wheels 138a-d can be installed. This process can be repeated on the opposite side 114 if necessary. The gooseneck frame 134 can be left on if desired on either side.

In some embodiments, to protect the wheel 14 of the motorcycle 12 and guide the wheel 14 into the recessed portion 122, a pair of wheel guides 136a, 136b may be provided on the chock 126, one wheel guide attached in between each free end and the crossbar 132 of the retractable wheel chock 126. The wheel guides 136*a*, 136*b* may be made of rubber so as not to damage the wheel 14 of the motorcycle 12.

In some embodiments, a plurality of wheels 138*a-d*, such as caster wheels, may be attachable to the platform 102. This allows the platform 102 to be mobile on its own. In other words, the platform 102 can be rolled from place to place due to the wheels 138*a-d* projecting below the bottom surface 120 of the platform 102. The wheels 138*a-d* can be secured with any fastening mechanism to the platform 102. Preferably, the wheels 138*a-d* are secured to each corner of the platform 102.

Figure 5:
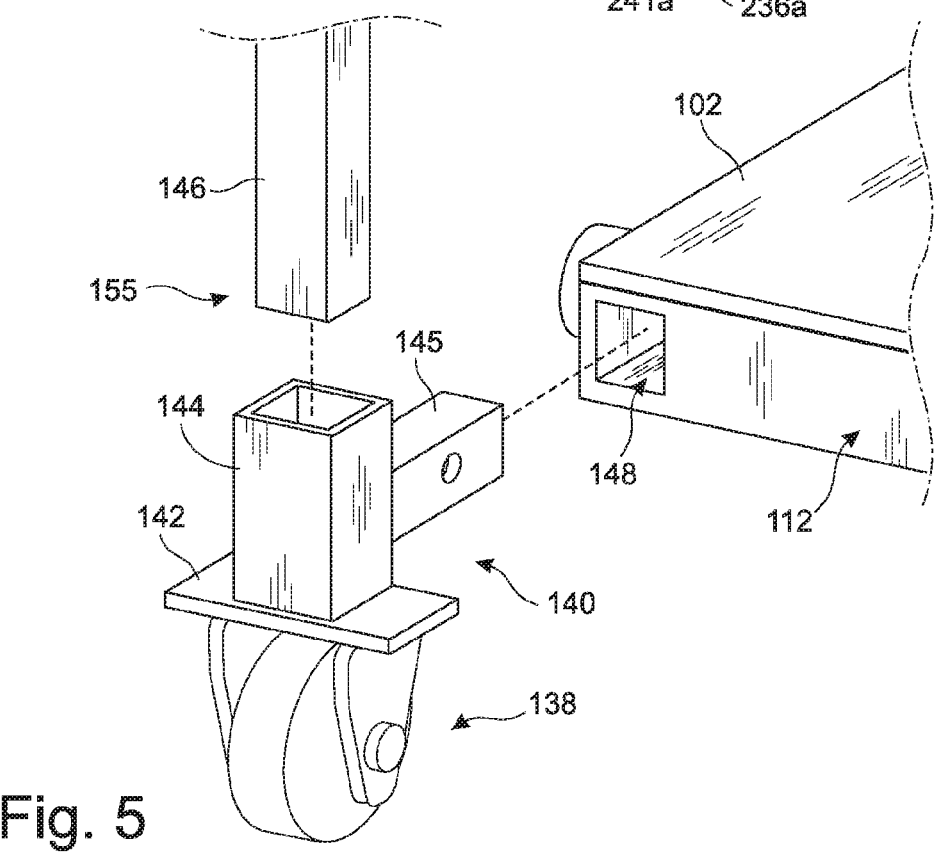
FIG. 5 shows a perspective view of the wheel assembly.

More preferably, the wheels 138*a-d* are attached to the platform 102 via a wheel assembly 140. As shown in FIG. 5, a single wheel assembly 140 will be described; however, this description applies to all the wheel assemblies attached to the wheels 138*a-d*. Each wheel assembly 140 comprises a flat plate 142, a vertical post 144 extending away from the flat plate 142, and a horizontal post 145 extending generally perpendicularly away from the vertical post 144. The platform 102 may comprise a plurality of channels 148 along the lateral sides, proximal side, and/or distal side. The horizontal post 145 of the wheel assembly 140 is configured to fit inside any of the channels 148. When the horizontal post 145 is inserted into the channel 148, the flat plate 142 is parallel to the top and bottom surfaces 118, 120 of the platform 102 and the vertical post 144 extends upwardly perpendicular to the top and bottom surfaces 118, 120 of the platform 102. The wheel 138 extends downwardly from the flat plate 142 to roll on the ground. The vertical post 144 may be hollow and configured to receive other posts as described in more detail below.

In some embodiments, the lift system 100 may further comprise a plurality of elongated posts 146*a-d*. Preferably, one elongated post 146*a-d* is attached to the platform 102 at each corner. The elongated posts 146*a-d* provide a variety of functions. For example, fastening mechanisms may be attached to the elongated posts 146*a-d* and the item to be lifted so as to secure the item to be lifted onto the platform 102. Lights 149*a*, 149*b* may be attached to the elongated posts 146*a-d* to make the platform 102 noticeable. These lights 149*a*, 149*b* can also be operatively connected to the vehicle 10 transporting the lift system 100 so that the signals activated by the vehicle 10 is transferred to the lift system 100. The elongated posts 146*a-d* can also serve as a secondary safety mechanism to catch the item, such as a motorcycle, in the event any braces or fasteners fail to function properly. Should the item fall, it would hit the elongated posts 146*a-d* first to protect not only the item, but also, people and objects around the item. Preferably, the elongated posts 146*a-d* are hollow or at least partially hollow so that cords 201, such as electrical cords, wires, and/or cables can be routed inside the elongated posts 146*a-d* for protection, safety, and aesthetics.

In the preferred embodiment, the elongated posts 146*a-d* have an L-shape configuration. With reference to FIG. 3, for purposes of expediency, only a single elongated post (e.g. elongated post 146*c*) will be described in detail; however, the following description applies to each of the elongated posts 146*a-d* as will be understood by a person of ordinary skill in the art. The elongated post 146*c* is defined by a long stem 150, having a first end 154 and a second end 155 opposite the first end 154, and a short stern 152 attached perpendicularly to the first end 154 of the long stem 150. The outer dimensions of both stems 150, 152 are substantially the same. In addition, both stems 150, 152 are configured to fit inside the channels 148 of the platform 102. Furthermore, both stems 150, 152 are configured to fit inside the hollow vertical post 144 of the wheel assembly 140. Preferably, the outer shape of both stems 150, 152 and the inner shape of the channels 148 and the hollow vertical post 144 are rectangular (which includes squares shaped). Having a rectangular shaped cross-section allows the elongated members 146*a-d* to be positioned in various orientations relative to the platform 102. For example, in one orientation, one wheel assembly 140 may be attached to each corner of the platform 102. Each vertical post 144 of the wheel assembly 140 projects upwardly perpendicular to the platform 102. A plurality of elongated posts 146*a-d* may be provided with one elongated post attached to one vertical post 144. In particular, the long stem 150 of an elongated post 146*a-d* may be inserted into its respective vertical post 144*a-d*. The elongated posts 146*a-d* may be oriented so that the two elongated posts 146*a*, 146*d* and 146*b*, 146*c* nearest each other have their respective short stems 152 directed towards each other. The short stems 152 can be pointed in various other directions as well to serve various other functions. For example, the short stems 152 can be used as a brace on to which straps and other fasteners can be attached. In addition, the short stems 152 can also be used as handles for moving the platform 102. The short stems 152 can also function as feet. For example, the platform 102 can be turned upside down so that the elongated posts 146*a-d* support the platform 102. The bottom surface 120 which is flat then becomes the top surface of a table.

Figure 6:
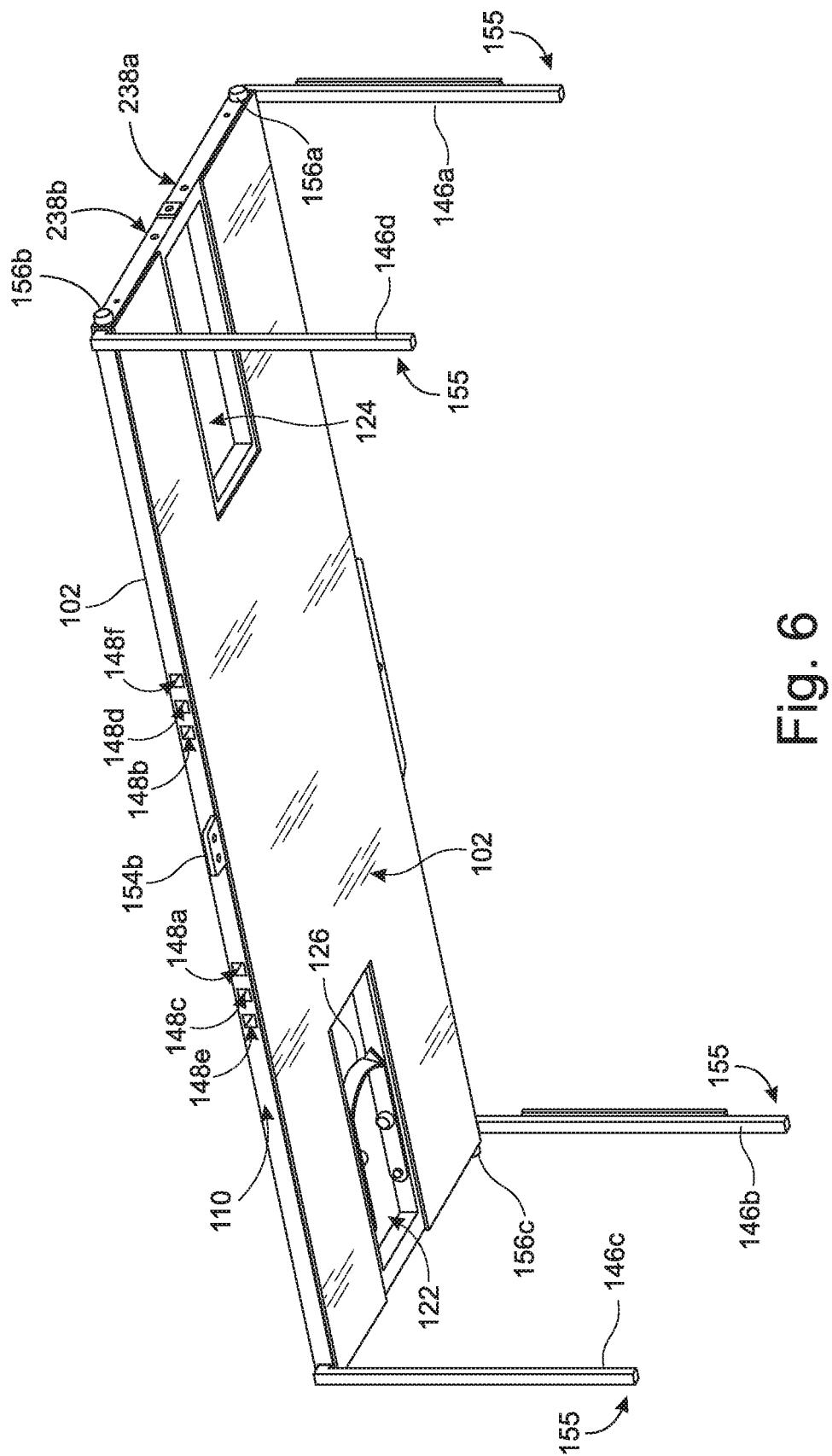
FIG. 6 shows a perspective view of an embodiment of the present invention being used as a tabletop.

In some embodiments, the platform 102 can be used without the wheel assembly 140 or the wheel assembly 140 can be removed. In such an embodiment, the elongated posts 146*a-d* can be directly inserted into the channels 148 of the platform 102. In the preferred configuration, the short stem 152 would be inserted into their respective channels 148 on the platforms 102 in such a manner that allows the long stem 150 to project upwardly perpendicularly to the top surface 118 (e.g., see, elongated post 146*a*). The long stem 150 can function as handles, braces, and the like. Again, the platform 102 can be turned upside down and the long stems 150 can function as legs and the platform 102 becomes a tabletop as discussed above and shown in FIG. 6 In this embodiment, however, since the wheels 138*a-d* have been omitted, the wheels 138*a-d* will not be projecting from the surface of the tabletop. In some embodiments, flat cover plates configured to cover the first and second recessed portions 122, 124 can be used so that the top surface 118 can be used as a flat tabletop.

In another configuration, the short stems 152 can be inserted into the channels 148 in such a manner that allows the long stems 150 to be parallel to the platform 102 (e.g., see, elongated post 146*b* in FIG. 2). For example, the channels 148 may be created along the proximal and distal sides 110, 112 adjacent to the corners. The short stem 152 of each elongated post 146*a-d* can be inserted into a channel 148 such that the long stem 150 extends along the proximal or distal sides 110, 112 towards each other. The length of the long stem 150 may be shorter than half the length of the platform 102 so that when all of the long stems 150 are placed in this configuration, the long stems 150 do not overlap with each other.

The platform 102 may comprise additional accessories to enhance the functionality of the lift system 100. For example, the distal side 112 of the platform 102 may further comprise lights 149*a*, 149*b* that are connected to the cords 201 for the taillights of the vehicle 10 like traditional trailers. If the lift system 100 is mounted on a vehicle 10, the vehicle's taillights may be obstructed by the platform 102 and the item mounted on the platform 102. Therefore, the portion of the lift system 100 that would be plainly visible by other vehicles driving behind the lift system 100 would be the distal side 112 of the platform 102. Thus, the distal side 112 of the platform 102 or the posts 146a, 146b on the distal side 112 may comprise lights 149a, 149b.

The platform 102 may also comprise various brackets 154a, 154b. The brackets 154a, 154b may be secured to the platform 102 along the proximal side 110, the distal side 112, and/or either lateral side 114, 116. Brackets 154a, 154b provide additional fastening points for straps, cables, chains, and the like for securing the item mounted on the platform 102 to the lift system 100.

The platform 102 may also comprise bumpers 156a, 156b mounted on the lateral sides 114, 116, the proximal side 110, and/or the distal side 112. The bumpers 156a, 156b can provide protection to the platform 102 as the platform 102 is moved about on its wheels 138a-d.

To facilitate lifting of the platform 102, lift arms 104a, 104b may be operatively connected to the proximal side 110 of the platform 102. Preferably, the lift system 100 comprises at least two lift arms 104a, 104b spaced apart along the proximal side 110 of the platform 102. In some embodiments, the lift arms 104a, 104b are removably attached to the proximal side 110 of the platform 102. This allows the platform 102 to be easily removed from the lift arms 104a, 104b and easily mounted on the lift arms 104a, 104b. In the preferred embodiment, the proximal side 110 of the platform 102 may comprise additional channels 148 into which the lift arms 104a, 104b can be inserted.

Figure 7A:
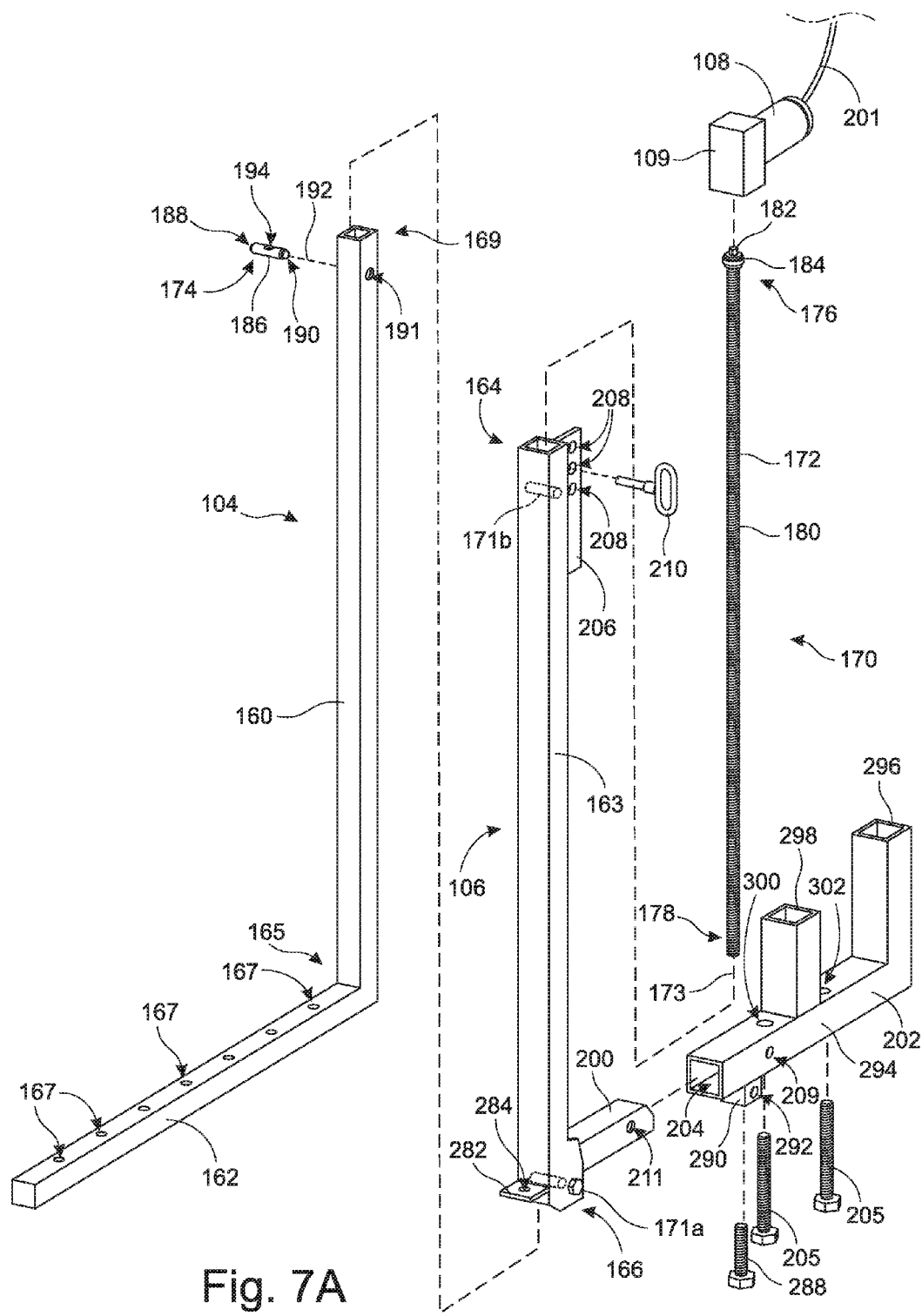
FIG. 7A shows an exploded view of the lift mechanism and receiver.

With reference to FIG. 7A, although a single lift mechanism will be described, the description applies to all lift mechanisms. The lift mechanism comprises a lift arm 104, a lift arm housing 106, and an electric motor 108. The lift arm 104 may be similar to the elongated arms 146a-d in that the lift arm 104 may also have an L-shaped configuration having a long stem 160 and a short stem 162 attached perpendicularly to one end 165 of the long stem 160. The short stem 162 of the lift arm 104 is configured to fit inside one of the channels 148 on the proximal side 110 of the platform 102 in such a way that allows its respective long stem 160 to project upwardly perpendicular to the top surface 118 of the platform 102. The short stem 162 may comprise a plurality of holes 167 through which the short stem 162 can be fastened to the platform 102. The platform 102 may comprise a plurality of corresponding holes on the bottom surface 120 that align with one or more of the plurality of holes 167. Fasteners can be used to fasten the short stems 162 inside their respective channels 148. The types of fasteners required to serve the intended purpose will be known by person of ordinary skill in the art. For example, used in the present invention any fastener can be bolts, screws, pins, and the like.

The lift arm housing 106 may be operatively connected to the lift arm 104. The lift arm housing 106 may be a hollow bar 163 having a top end 164 and a bottom end 166 opposite the top end 164. The lift arm 104 is configured to slide in and out of the lift arm housing 106 at the bottom end 166. Therefore, the lift arm housing 106 can be slid over the top end 169 of the lift arm 104 towards the bottom end 165. Inside the lift arm housing 106 is a lift device 170 attachable to the lift arm 104. The lift device 170 raises and lowers the lift arm 104 within the lift arm housing 106.

In the preferred embodiment, the lift device 170 comprises a threaded bolt 172 and a barrel nut 174. In general, the threaded bolt 172 has a first end 176 and a second end 178 opposite the first end 176 with threading 180 therebetween. The first end 176 of the threaded bolt 172 comprises a head 182 and a bearing 184 adjacent to the head 182. The head 182 is housed inside a motor bracket 109 and is operatively connected to the electric motor 108, which may be mounted on the motor bracket 109. The electric motor 108 rotates the head 182 of the threaded bolt 172. Due to the bearing 184, the threaded bolt 172 rotates about its longitudinal axis 173 without moving along its longitudinal axis 173. The threaded bolt 172 may be secured to the motor bracket 109 or the lift arm housing via the bearing 184 so as to allow the threaded bolt 172 to rotate without moving longitudinally along its axis 173.

The barrel nut 174 is a cylindrical shaped nut defined by a sidewall 186 bound by two ends 188, 190. The barrel nut 174 defines a longitudinal axis 192 through the two ends 188, 190 and parallel to the sidewall 186. A threaded through hole 194 is created through the sidewall 186 of the barrel nut 174 perpendicular to the longitudinal axis 192. The threaded through hole 194 is configured to thread onto the threaded bolt 172. The top end 169 of the lift arm 104 comprises a through hole 191 to receive the barrel nut 174 and fix the location of the barrel nut 174 relative to the lift arm 104.

Rotation of the head 182 of the threaded bolt 172 in a first direction while the barrel nut 174 is rotationally fixed relative to the threaded bolt 172 causes the barrel nut 174 to rise up the threaded bolt 172. Rotation of the head 182 of the threaded bolt 172 in a second direction opposite the first direction while the barrel nut 174 is rotationally fixed relative to the threaded bolt 172 causes the barrel nut 174 to descend along the threaded bolt 172.

Therefore, the first end 176 of the threaded bolt 172 may be fixed relative to the lift arm housing 106 so as not to move longitudinally relative to the lift arm housing 106. The barrel nut 174 is mounted at the second end 178 of the threaded bolt 172 so as to move along the threads 180 of the threaded bolt 172 when the threaded bolt 172 is rotated. The barrel nut 174 may be fixed to the lift arm 104 preferably adjacent the top end 169.

To facilitate the lift arm 104 traveling up and down the lift arm housing 106, the bottom end 166 of the lift arm housing 106 may comprise a roller bolt 171a. The roller bolt 171a travels across the width of the lift arm housing 106. The lift arm 104 abuts against the roller bolt 171a when housed inside the lift arm housing 106. As the lift arm 104 rises up and down within the lift arm housing 106, the lift arm 104 rides against the roller bolt 171a. The roller bolt 171a rotates in place to allow the lift arm 104 to travel smoothly. In some embodiments, the lift arm housing 106 may comprise a second roller bolt 171b at the top end 169. In some embodiments, the first roller bolt 171a and the second roller bolt 171b are on opposite sides of the lift arm housing 106. For example, the first roller bolt 171a may be adjacent to the back wall of the lift arm housing 106 and the second roller bolt 171b may be adjacent to the front wall of the lift arm housing 106.

The lift arm housing 106 further comprises a horizontal bar 200 projecting perpendicularly from the hollow bar 163 adjacent the bottom end 166. The horizontal bar 200 may be a sturdy metal bar that can be operatively connected to a receiver 202 that has been mounted on the vehicle 10. In the preferred embodiment, the horizontal bar 200 has a rectangular cross-section to be inserted into a receiver 202 defining a rectangular channel 204.

The lift arm housing 106 may further comprise a pull rod bracket 206 adjacent to the top end 164 of the lift arm housing 106. The pull rod bracket 206 projects perpendicularly from the lift arm housing 106 in the same direction as the horizontal bar 200. The pull rod bracket 206 allows the top end 164 of the lift arm housing 106 to be stabilized against the vehicle 10 as discussed in more detail below. Preferably, the pull rod bracket 206 comprises a plurality of holes 208 through which fasteners can be inserted. Having a series of holes 208 allows the lift arm housing 106 to be secured at various heights. Preferably, the fastener 210 is a pull rod. The fasteners 210a, 210b may be rods, pins, dowels, and the like that can slip in and out of the holes for quick and easy attachment and release. Securement may be by resistance fit. In some embodiments, the fasteners 210a, 210b may be threaded for added security.

The lift arm housing 106 may further comprise a tab 282 located adjacent to the bottom end 166 of the lift arm housing 106. The tab 282 may comprise a hole 284. The hole 284 of the tab 282 may align with one of the holes 167 of the lift arm 104 along the short stem 162, preferably adjacent to the long stem 160. A fastener 286 may be inserted through the hole 284 of the tab 282 and the hole 167 of the lift arm 104 to fasten the lift arm 104 to the lift arm housing 106 as a secondary measure of protection. Therefore, if the lift device 170 breaks, the lift arm 104 will not fall out of the housing 106. As such, the platform 102 will not come crashing down if the lift device 170 breaks.

An electric motor 108 is operatively connected to the lift mechanism to cause the lift arm 104 to slide in and out of the lift arm housing 106. Preferably, the electric motor 108 is mounted on the top end 164 of the lift arm housing 106. A motor bracket 109 may be provided at the top end 164 of the lift arm housing 106 to secure the electric motor 108.

A receiver 202 may be used for connecting the platform 102 to the vehicle 10. Therefore, a receiver 202 mountable on the vehicle 10 is attached to the vehicle 10. Preferably, the receiver 202 is attached to the underside of the vehicle 10. More preferably, the receiver 202 comprises an open channel 204 into which the horizontal bar 200 can be inserted. Fasteners 207 can also be used to secure the horizontal bar 200 inside the receiver 202. Preferably, the receiver 202 and the horizontal bar 200 each have holes 209, 211 that can be aligned with each other once the horizontal bar 200 is inserted into the receiver 202 through which a faster 207 can be inserted to secure the horizontal bar 200 in the receiver 202.

Additional holes may be provided on the horizontal bar 200 and the receiver 202 for additional securement of the horizontal bar 200 to the receiver 202. For example, holes (not shown) may be provided on the underside of the horizontal bar 200 and receiver 202 for alignment. Another fastener 288 may be inserted through the holes to secure the horizontal bar 200 to the receiver 200 from the bottom side. A shield 290 may surround the hole on the underside of the receiver 202. The shield 290 may have a through hole 292 from one wall to the opposite wall. The shield 290 may be open at the bottom to allow a fastener 288 to be inserted into the hole on the underside of the receiver 202. A lock, such as a padlock, combination lock, and the like, may be inserted through the through hole 292 and locked. The lock prevents unauthorized removal of the lift arm housing 106 from the receiver 202 as it precludes access to the fastener 288, which is protected by the shield 290.

In the preferred embodiment, the receiver 202 comprises a main bar 294 into which the horizontal bar 200 is inserted, and two stabilizing bars 296, 298 projecting perpendicularly from the main bar 294 in the same direction and spaced apart from each other. The first stabilizing bar 296 is located adjacent to the terminal end of the main bar 294 opposite where the horizontal bar 200 attaches. The second stabilizing bar 298 is more centrally located on the main bar 294 in between the first stabilizing bar 296 and the opposite end of the main bar 294 where the horizontal bar attaches. A pair of holes 300, 302 may be bilaterally arranged on the top side and bottom side of the main bar 294 on opposite sides of the second stabilizing bar 298. Fasteners 205 may be inserted through these holes 300, 302 to secure the receiver 202 to the vehicle or any other suitable structure. In the preferred embodiment, a solid structural component of the vehicle or other structure may be placed in between the space defined by the first stabilizing bar 296 and the second stabilizing bar 298. By placing a solid structural component in between the space defined by the first stabilizing bar 296 and the second stabilizing bar 298, movement of the receiver 202 is significantly reduced. In particular, pitch-type movement is minimized. If a structural component of the vehicle does not exist to fit in that space, such a structural piece can be attached to the vehicle. In some embodiments, the first stabilizing bar 296 and/or the second stabilizing bar 298 may be adjustable along the main bar 294 so as to be able to clamp a solid structural component of the vehicle in between the space defined by the first stabilizing bar 296 and the second stabilizing bar 298.

Figure 7B:
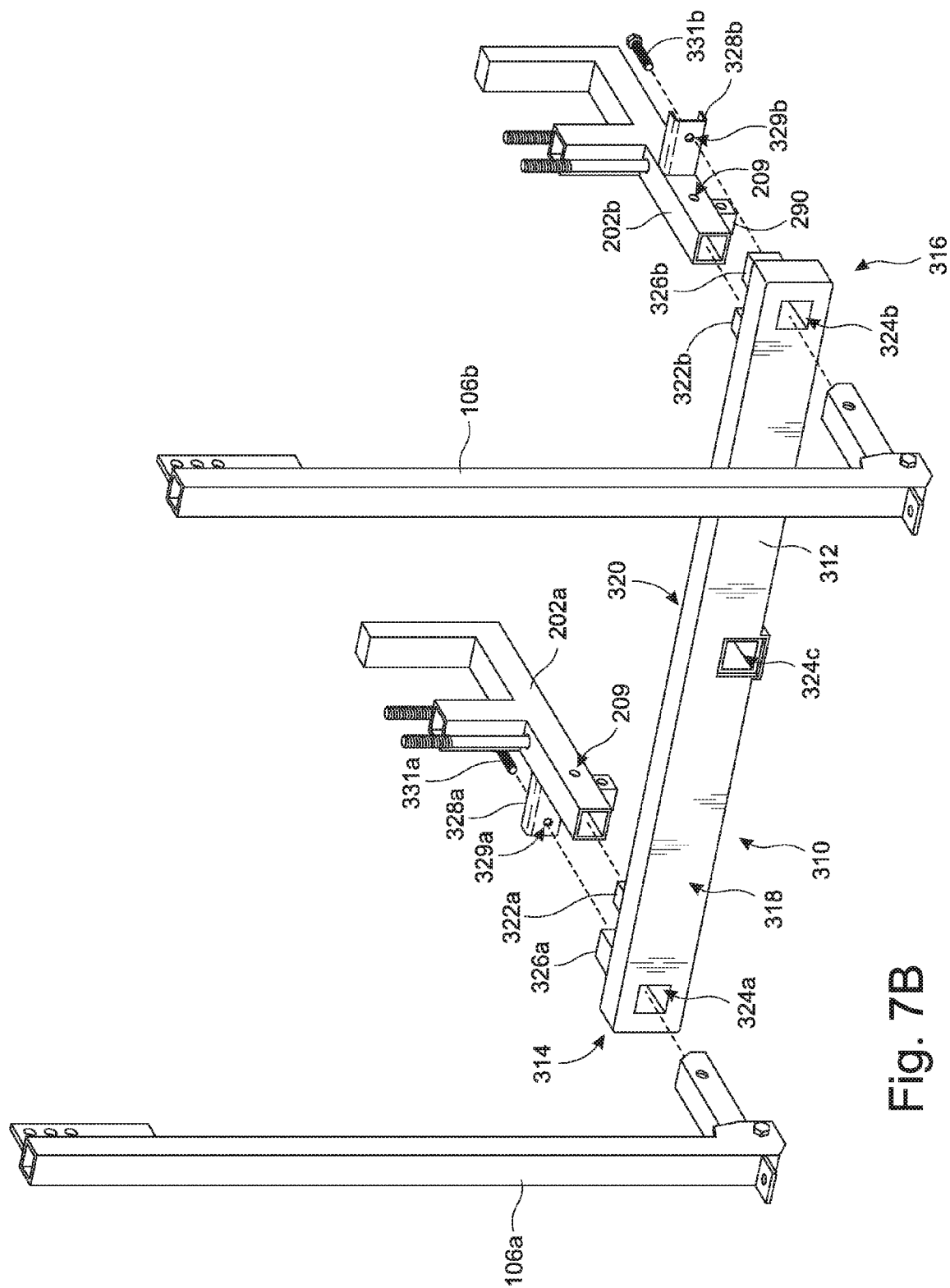
FIG. 7B shows an exploded view of receiver adapter connection.

With reference to FIG. 7B, in some embodiments, the lift system 100 may further comprise a receiver adapter 310. The receiver adapter 310 allows the same lift system 100 to be attached to a variety of different types of vehicles. Vehicles come in various sizes. Once the receivers 202a, 202b are properly secured to a vehicle, the spacing between the receivers 202a, 202b may not necessarily provide the proper spacing to receive the lift arm housings 106a, 106b. To account for the fact that the space in between receivers 202a, 202b may be different across different vehicles, the receiver adapter 310 may be provided. The receiver adapter 310 comprises a main frame 312 having a first end 314, a second end 316 opposite the first end 314, a front face 318, and a back face 320 opposite the front face 318. Protruding perpendicularly from the back face 320 in the rearward direction is a pair of connection bars 322a, 322b. Although only two connection bars 322a, 322b are shown, the receiver adapter 310 may have more connection bars based on the predicted locations of where the receivers 202a, 202b can be attached on appropriate vehicles or other structures with which the lift system 100 can be used. Once the receivers 202a, 202b are installed on the vehicle or other structures, the proper pair of connection bars 322a, 322b can be inserted into the receivers 202a, 202b.

On the front face 318 are holes 324a, 324b into which the horizontal bars 200a, 200b of the lift arm housings 106a, 106b can be inserted. The holes 324a, 324b are spaced apart to match the distance between the horizontal bars 200a, 200b. In some embodiments, the front face 318 may further comprise a central hole 324c for vehicles that may have a center receiver already installed.

The receiver adapter 310 can be fastened to the receiver in a variety of ways. For example, the connection bars 322a, 322b may be configured similar to the horizontal bars 200a, 200b and attach to the receivers in a similar manner. In some embodiments, each receiver 202a, 202b may further comprise a flange 328a, 328b protruding perpendicularly from the outboard side of the receiver 202a, 202b. The flanges 328a, 328b may comprise a hole 329a, 329b into which a fastener 331a, 331b can be inserted to fasten the receivers 202a, 202b to the receiver adapter 310.

In some embodiments, opposite each hole 324a, 324b of the receiver adapter 310 may be extensions 326a, 326b. These extensions 326a, 326b are configured to mate with their respective flanges 328a, 328b. Inside each extension 326a, 326b may be a wall with a hole into which the fastener 331a, 331b can be fastened.

In some embodiments, rather than utilizing a receiver adapter 310, the proximal side 110 of the platform 102 may comprise a plurality of paired channels 148a/148b, 148c/148d, 148e/148f. The receivers 202a, 202b can be installed on the vehicle. Depending on the spacing in between the receivers 202a, 202b, the lift arm housings 106a, 106b can be installed into the appropriate paired channel 148a/148b, 148c/148d, or 148e/148f so that the horizontal bars 200a, 200b can fit into the receivers 202a, 202b.

Figure 8A:
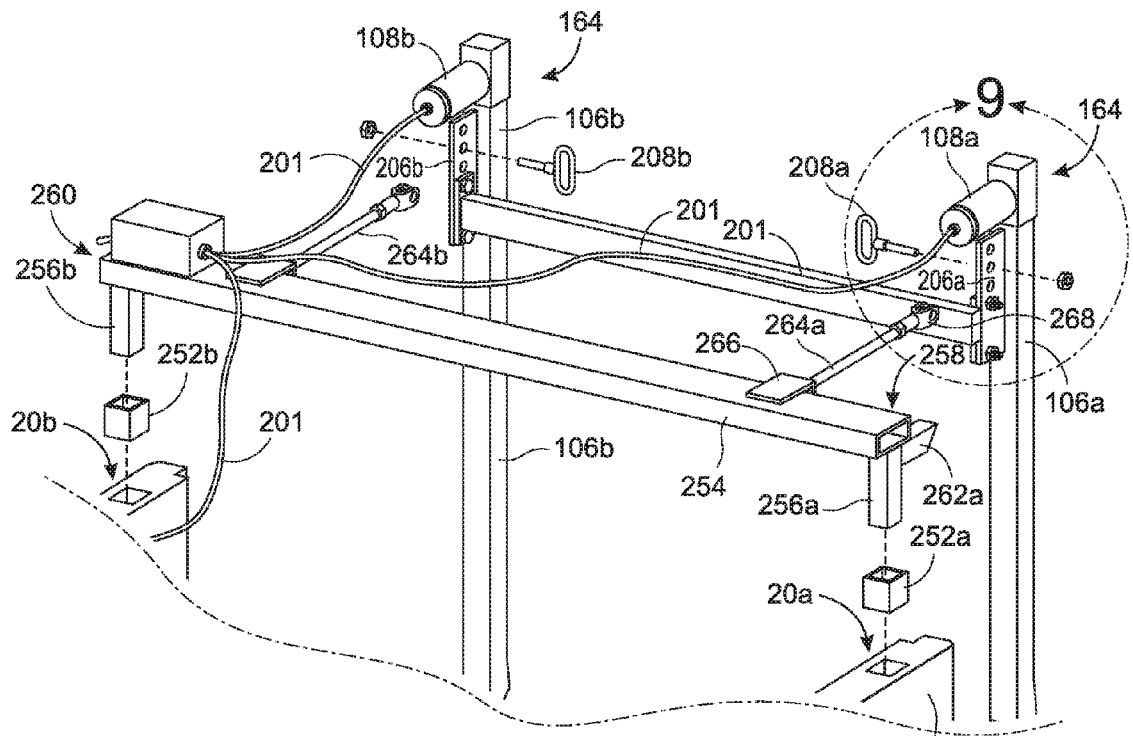
FIG. 8A shows a perspective view of the cross brace and portions of the lift mechanism.

With reference to FIG. 8A, a cross brace 250 may be attached to the upper portion of the vehicle 10. However, as is the case for the receivers, the cross brace 250 can be attached to any suitable structure, including walls, stands, frames, and the like for storage purposes. Alternatively, the wall, stand, frame, and the like may have a second cross brace so that the cross brace attached to the vehicle need not be removed from the vehicle. Nonetheless, for purposes of describing the utility of the cross brace 250, the vehicle will be used as an example.

If the vehicle 10 is a truck, the cross brace 250 may be attached to the bed 18 of the truck. In fact, some pickup trucks are designed with pockets 20. These pockets 20 are typically used to mount bed rails, frames, and the like. In the preferred embodiment, a bed pocket spacer 252a, 252b may be inserted into the pocket 20 for stability. The cross brace 250 comprises a main brace 254 that is long enough to extend the width of the truck bed 18, a pair of pocket braces 256a, 256b at opposite ends 258, 260 of the main brace 254 extending perpendicularly to the main brace 254, parallel to each other, and projecting in the same direction, and a pair of bed supports 262a, 262b, one bed support located at each end 258, 260 of the main brace 254 adjacent to one pocket brace 256a, 256b, wherein each bed support 262a, 262b is perpendicular to the main brace 254 and the pocket braces 256a, 256b. In this configuration, the pocket braces 256a, 256b can be inserted into the pockets 20a, 20b of the truck bed 18 until the bed supports 262a, 262b abut against the truck bed 18. The main brace 254 spans across the entire width of the truck bed 18.

The cross brace 250 is attachable to the lift arm housing 106 at the top end 164 via one or more pull rods 264a, 264b. The pull rod 264a, 264b is located in between the first end 258 and the second end 260 of the main brace 254. Preferably, the cross brace 250 has two pull rods 264a, 264b, one for each lift arm housing 106a, 106b. Only a single pull rod 264a will be described; however, the description applies to all pull rods 264a, 264b. The pull rod 264a comprises a clamp 266 at one end and a connector 268 at the opposite end. The clamp 266 is configured to attach to the main brace 254, while the connector 268 attaches to the lift arm housing 106. Preferably, the connector 268 attaches to the pull rod bracket 206.

In the preferred embodiment, the connector 268 is a U-bracket defined by a first plate 272, a second plate 274 parallel and opposite first plate 272, and a bridge 276 therebetween connecting the first plate 272 to the second plate 274. The first and second plates 272, 274 each comprise a through hole 278, 280 concentrically aligned with each other. The distance between the first and second plates 272, 274 is slightly larger than the thickness of the rod bracket 206. This allows the connector 268 to slide onto the pull rod bracket 206 with the first and second plates 272, 274 on opposite sides of the pull rod bracket 206. The through holes 278, 280 of the first and second plates 272, 274 can be aligned with one of the holes 208 of the pull rod bracket 206. A fastener 210, such as a pin, can then be inserted through all three holes 278, 280, 208 to secure the connector 268 to the pull rod bracket 206. If the user wants to remove the platform 102 from the vehicle then, the user can lower the platform 102 to the ground and remove the fastener 210 from the connector 268 and from the pull rod bracket 206. A fastener securing the horizontal bar 200 to the receiver 202 can also be removed. The user can then pull the platform 102 away from the vehicle 10 as the platform 102 rides on its wheels 138a-d.

Figure 8B:
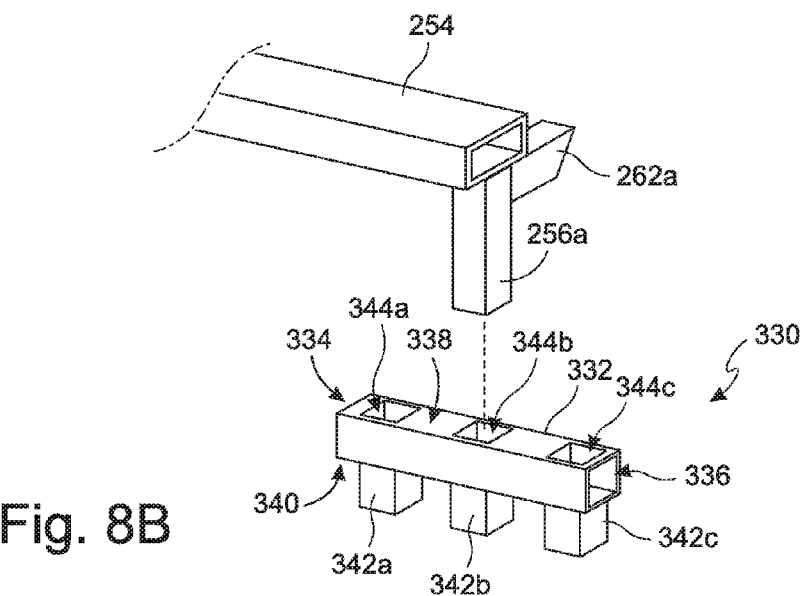
FIG. 8B shows a perspective view of the cross brace adapter connection.
Figure 9:
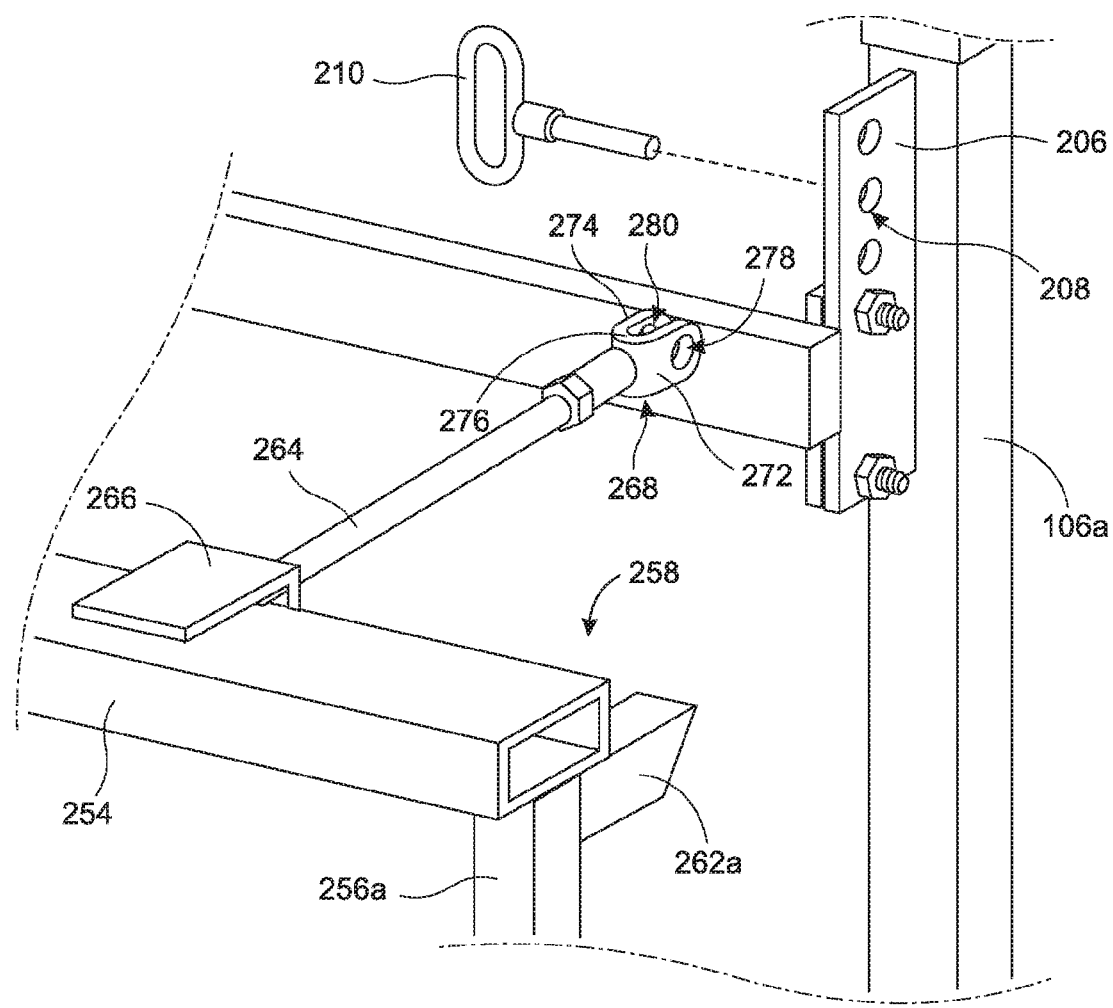
FIG. 9 shows a close-up view of section 9 shown in FIG. 8A.

As shown in FIG. 8B, in some embodiments, the lift system 100 may further comprise a cross brace adapter 330. The cross brace adapter 330 allows one cross brace 250 to be used on a variety of different vehicles having different sizes. Although a single cross brace adapter 330 will be described for one side, a second cross brace adapter can be used on the opposite side of the cross brace 250.

The cross brace adapter 330 comprises a main frame 332 having a first end 334, a second end 336 opposite the first end 334, a top face 338, and a bottom face 340 opposite the top face 338. Protruding downward are a plurality of connection bars 342a, 342b, 342c. Although only three connection bars 342a-c are shown, the cross brace adapter 330 may have more connection bars. Any one of the connection bars 342a-c can be inserted into one of the pockets 20a, 20b of the truck bed 18.

On the top face 338, opposite each connection bar 342a-c may be holes 344a-c into which the horizontal bars 200a, 200b of the lift arm housings 106a, 106b can be inserted. Any one of the pocket braces 256a, 256b can be inserted into whichever hole 344a-c with which the pocket brace 256a or 256b aligns. The same can be done on the opposite side of the cross brace 250 with a second cross brace adapter. In some embodiments, there may be one central hole 344b on the top face 338.

Various components, including portions of the platform 102 may be hollow so as to allow cords 201 to be routed through the lift system 100 and provide electrical power at the desired locations. For example, power may be required for lights 149a, 149b and the electric motor 108.

By way of example only, use of the lift system 100 of the present invention for loading a motorcycle 12 as the item will be described. In addition, the structure in this example will be a vehicle 10, and more particularly, a truck. However, the structure can be a wall, frame, stand and the like so that the lift system 100 can be stored rather than transported. For example, the structure could be a wall, frame, stand, and the like, in a garage. If the structure is a wall, frame, stand, or the like, the structure may have its own set of receivers, or the receivers 202a, 202b of the lift system 100 can be removed from the vehicle and attached to the wall, frame, stand, and the like. Then, the platform 102 can be removed from the vehicle, taken to the wall, frame, stand, and the like, and attached thereto for storage.

Once the platform 102 is acquired, the platform 102 is laid on the floor with the bottom surface 120 on the floor and the top surface 118 facing up. A plurality of wheels 138a-d may be attached to the platform 102 so that the wheels 138a-d project below the bottom surface 120. In some embodiments, a first set of wheels 138a, 138d may be attached to the platform 102 prior to loading the motorcycle 12 on the platform 102, preferably on the first lateral side 114. This causes the platform 102 to be angled making it easier to load the motorcycle 12 onto the platform 102. Once the motorcycle 12 has been placed on the platform 102, a second set of wheels 138b, 138c can be attached to the platform 102, preferably on the second lateral side 116.

With the motorcycle 12 on the platform 102, it would be difficult to lift the second lateral side 116 of the platform 102 to install the wheels 138b, 138c. Therefore, a gooseneck frame 134 may be attached to the second lateral side 116 of the platform 102. Due to the configuration of the gooseneck frame 134, a jack can then be placed under the gooseneck frame 134 to lift platform 102 to permit the second set of wheels 138b, 138c to be attached to the platform 102.

A plurality of elongated posts 146a-d may be attached to the platform 102 via the wheels 138a-d so that the elongated posts 146a-d project above the top surface 118 with one elongated post is attached to one wheel. Each wheel 138a-d is attached to a wheel assembly 140, which comprises a vertical post 144. Each vertical post 144 is hollow and configured to receive an elongated post 146. Therefore, the second end 155 can be inserted into the vertical post 144. In some embodiments, the short stem 152 may be inserted into the vertical post 144.

A lift mechanism can be attached to the proximal side 110 of the platform 102 by inserting the short stem 162 of the lift arm 104 into one of the holes 148 on the proximal side 110 of the platform 102. A fastener can be used to secure the short stems 162 on to the platform 102.

The platform 102 can then be rolled to the vehicle 10 to which the platform 102 will be secured. In this example, the vehicle 10 is a truck. A receiver 202 is mounted on to the underside of the vehicle 10. The receiver 202 comprises an opening 204 configured to receive the horizontal bar 200 of the lift arm housing 106. The horizontal bar 200 of each lift arm housing 106a, 106b may be inserted into their respective receivers 202. The lift arms 104a, 104b may have to be raised or lowered so as to align the horizontal bar 200 with its respective receiver 202.

Activating the electric motor 108 raises the platform 102, with the motorcycle 12 on it, thereby lifting the motorcycle 12.

In some embodiments, to better secure the lift arm housing 106 to the truck, a cross brace 250 may be mounted onto the truck bed 18. A pull rod 264a may be attached to the lift arm housing 106a at a pull rod bracket 206a by inserting a first fastener 210a through the pull rod 264a and the pull rod bracket 206a. This can be repeated on the opposite side by attaching a second pull rod 264b to a second pull rod bracket 206b on a second lift arm housing 106b with a second fastener 210b.

To remove the platform 102 from the truck 10, the electric motor 108 is activated in reverse to lower the platform 102. The horizontal bar 200 is detached from the receiver 202. If the pull rod 264 was attached to the pull rod bracket 206, then the pull rod 264 can be detached from the pull rod bracket 206 by removing the fastener 210. The platform 102 can be rolled away from the truck and placed anywhere else for storage. Alternatively, the motorcycle 12 can be removed from the platform 102 and the platform 102 can be used as a table. Was the motorcycle 12 has been removed from the platform 102, the user can simply re-orient the platform 102 by turning the platform 102 upside down to stand on the elongated posts 146a-d.

Alternatively, the user can first remove the wheels 138a-d from the platform 102, remove the elongated posts 146a-d from their respective wheels 138a-d and reattach the elongated posts 146a-d directly to the platform 102. The platform 102 can then be turned over so that the elongated posts 146a-d function as legs and the bottom surface 120 of the platform 102 functions as a tabletop.

The foregoing description of the preferred embodiment of the invention has been presented for the purposes of illustration and description. It is not intended to be exhaustive or to the invention to the precise form disclosed. Many modifications and variations are possible in light of the above teaching. It is intended that the scope of the invention not be limited by this detailed description, but by the claims and the equivalents to the claims appended hereto.

What is claimed is:

1. A lift system for trucks, comprising:
   a. a platform, the platform comprising a proximal side, a distal side opposite the proximal side, a first lateral side adjacent to the proximal side and the distal side, a second lateral side opposite the first lateral side and adjacent to the proximal side and the distal side, a top surface bound by the proximal side, distal side, and first and second lateral sides, and a bottom surface opposite the top surface, wherein the top surface comprises a first recessed portion adjacent to the first lateral side and a second recess portion adjacent to the second lateral side;
   b. a retractable wheel chock attachable to the first recessed portion, the retractable wheel chock having a stowed configuration in which the chock is generally flush with the top surface of the platform, and a deployed configuration in which the chock protrudes above the top surface of the platform, the retractable chock having a U-shaped configuration defined by a pair of bars parallel to each other, each bar having a free end and a connected end, wherein the connected ends of each bar are connected to each other by a crossbar, wherein the free ends of the bars are rotatably connected to the platform inside the first recessed portion;
   c. a pair of wheel guides, one wheel guide attached adjacent to each free end of the retractable wheel chock;
   d. a gooseneck frame attachable to the second lateral side of the platform, the gooseneck frame having a zig-zag profile;
   e. a plurality of caster wheels attachable to the platform, each caster wheel comprising a vertical post;
   f. a plurality of elongated posts attachable to the vertical posts of the caster wheels;
   g. a lift arm operatively connected to the proximal side of the platform;
   h. a lift arm housing operatively connected to the lift arm, the lift arm housing having a top end and a bottom end opposite the top end, the lift arm configured to slide in and out of the lift arm housing at the bottom end;
   i. a horizontal bar operatively connected to the lift arm housing adjacent the bottom end;
   j. a receiver mountable on the truck, wherein the horizontal bar is attachable to the receiver;
   k. a cross brace attachable to the lift arm housing at the top end, the cross brace having a first end, a second end, and a pull rod therebetween, the first and second ends attachable to the truck, the pull rod attachable to the lift arm housing at a pull rod bracket;
   l. an electric motor mounted on the top end of the lift arm housing, the electric motor operatively connected to the lift arm to cause the lift arm to slide in and out of the lift arm housing; and
   m. a lift device housed inside the lift arm housing, the lift device comprising a threaded bolt, a head attached to the threaded bolt to rotate the threaded bolt about a longitudinal axis of the threaded bolt, and a barrel nut attachable to the threaded bolt, wherein the barrel nut is fixed to the lift arm, and wherein when the head is rotated by the electric motor in a first rotational direction, the barrel nut rises along the threaded bolt, and when the head is rotated in a second rotational direction opposite the first rotational direction, the barrel nut descends along the threaded bolt, thereby raising and lowering the lift arm through rotation of the threaded bolt.

2. A lift system, comprising:
 a. a platform, the platform comprising a proximal side, a distal side opposite the proximal side, a first lateral side adjacent to the proximal side and the distal side, a second lateral side opposite the first lateral side and adjacent to the proximal side and the distal side, a top surface and a bottom surface opposite the top surface;
 b. a plurality of elongated posts attachable to the platform;
 c. a lift arm operatively connected to the proximal side of the platform;
 d. a lift arm housing operatively connected to the lift arm, the lift arm housing having a top end and a bottom end opposite the top end, the lift arm configured to slide in and out of the lift arm housing at the bottom end;
 e. a horizontal bar operatively connected to the lift arm housing adjacent the bottom end;
 f. a lift device housed inside the lift arm housing, the lift device operatively connected to the lift arm;
 g. a motor operatively connected to the lift device to cause the lift arm to slide in and out of the lift arm housing; and
 h. a gooseneck frame having a zig-zag profile attachable to the second lateral side of the platform.

3. The lift system of claim 2, further comprising a retractable wheel chock attachable to the top surface, the retractable wheel chock having a stowed configuration in which the chock is generally parallel with the top surface of the platform, and a deployed configuration in which the chock juts away from the top surface of the platform.

4. The lift system of claim 2, wherein the top surface comprises a first recessed portion adjacent to the first lateral side and a second recess portion adjacent to the second lateral side.

5. The lift system of claim 2, further comprising a plurality of wheels attachable to the platform, wherein each wheel comprises a wheel assembly having a vertical post and configured to receive one of the elongated posts.

6. The lift system of claim 2, further comprising a receiver mountable on a structure, wherein the horizontal bar is attachable to the receiver.

7. The lift system of claim 6, wherein the receiver comprises:
 a. a main bar having a top side, a bottom side opposite the top side, a first terminal end and a second terminal end opposite the first terminal end,
 b. two stabilizing bars projecting perpendicularly from the main bar in the same direction and spaced apart from each other, wherein the first stabilizing bar is located adjacent to the first terminal end of the main bar opposite where the horizontal bar attaches, and the second stabilizing bar is located in between the first stabilizing bar and the second terminal end, and
 c. a pair of holes on the main bar bilaterally arranged on opposite sides of the second stabilizing bar.

8. The lift system of claim 2, wherein the lift device comprises a threaded bolt, a head attached to the threaded bolt to rotate the threaded bolt about a longitudinal axis of the threaded bolt, and a barrel nut attachable to the threaded bolt, wherein the barrel nut is fixed to the lift arm, and wherein when the head is rotated by the motor in a first rotational direction, the barrel nut rises along the threaded bolt, and when the head is rotated in a second rotational direction opposite the first rotational direction, the barrel nut descends along the threaded bolt, thereby raising and lowering the lift arm through rotation of the threaded bolt.

9. The lift system of claim 2, wherein each elongated post comprises a long stem having a first end and a second end, and a short stem attached to the long stem at the second end in a perpendicular manner, wherein the short stem is configured to attach to the platform in a plurality of the orientations such that the long stem can project perpendicularly above the top surface, parallel to the top surface, and below the top surface.

10. The lift system of claim 2, wherein the lift arm housing comprises a tab adjacent to the bottom end of the lift arm housing, the tab defining a hole into which a fastener can be inserted to fasten the lift arm housing to the lift arm.

11. A lift system, comprising:
 a. a platform, the platform comprising a proximal side, a distal side opposite the proximal side, a first lateral side adjacent to the proximal side and the distal side, a second lateral side opposite the first lateral side and adjacent to the proximal side and the distal side, a top surface and a bottom surface opposite the top surface;
 b. a plurality of elongated posts attachable to the platform;
 c. a lift arm operatively connected to the proximal side of the platform;
 d. a lift arm housing operatively connected to the lift arm, the lift arm housing having a top end and a bottom end opposite the top end, the lift arm configured to slide in and out of the lift arm housing at the bottom end;
 e. a horizontal bar operatively connected to the lift arm housing adjacent the bottom end;
 f. a lift device housed inside the lift arm housing, the lift device operatively connected to the lift arm;
 g. a motor operatively connected to the lift device to cause the lift arm to slide in and out of the lift arm housing;
 h. a receiver mountable on a structure, wherein the horizontal bar is attachable to the receiver; and
 i. a receiver adapter, the receiver adapter comprising a main frame having a first end, a second end opposite the first end, a front face, and a back face opposite the front face, a pair of connection bars protruding perpendicularly from the back face in the rearward direction, and a pair of holes on the front face into which the horizontal bars of the lift arm housings can be inserted.

12. The lift system of claim 11, wherein the receiver further comprises a flange to attach the receiver adapter to the receiver.

13. A lift system, comprising:
 a. a platform, the platform comprising a proximal side, a distal side opposite the proximal side, a first lateral side adjacent to the proximal side and the distal side, a second lateral side opposite the first lateral side and adjacent to the proximal side and the distal side, a top surface and a bottom surface opposite the top surface;
 b. a plurality of elongated posts attachable to the platform;
 c. a lift arm operatively connected to the proximal side of the platform;
 d. a lift arm housing operatively connected to the lift arm, the lift arm housing having a top end and a bottom end opposite the top end, the lift arm configured to slide in and out of the lift arm housing at the bottom end;
 e. a horizontal bar operatively connected to the lift arm housing adjacent the bottom end;

f. a lift device housed inside the lift arm housing, the lift device operatively connected to the lift arm;
g. a motor operatively connected to the lift device to cause the lift arm to slide in and out of the lift arm housing; and
h. a receiver mountable on a structure, wherein the horizontal bar is attachable to the receiver; wherein the receiver further comprises a shield on a bottom side of the receiver to protect a fastener fastening the receiver to the structure.

14. A lift system, comprising:
a. a platform, the platform comprising a proximal side, a distal side opposite the proximal side, a first lateral side adjacent to the proximal side and the distal side, a second lateral side opposite the first lateral side and adjacent to the proximal side and the distal side, a top surface and a bottom surface opposite the top surface;
b. a plurality of elongated posts attachable to the platform;
c. a lift arm operatively connected to the proximal side of the platform;
d. a lift arm housing operatively connected to the lift arm, the lift arm housing having a top end and a bottom end opposite the top end, the lift arm configured to slide in and out of the lift arm housing at the bottom end;
e. a horizontal bar operatively connected to the lift arm housing adjacent the bottom end;
f. a lift device housed inside the lift arm housing, the lift device operatively connected to the lift arm;
g. a motor operatively connected to the lift device to cause the lift arm to slide in and out of the lift arm housing; and
h. a cross brace attachable to the lift arm housing at the top end and a structure to secure the lift arm housing to the structure.

15. The lift system of claim 14, wherein the cross brace has a first end, a second end, and a pull rod therebetween, wherein the pull rod is attachable to the lift arm housing at a pull rod bracket.

16. The lift system of claim 15, further comprising a cross brace adapter, the cross brace adapter comprising:
a. a main frame having a first end, a second end opposite the first end, a top face, and a bottom face opposite the top face;
b. a plurality of connection bars protruding downward from the bottom face; and
c. at least one hole on the top face.

17. A method of using a lift system to support an item, comprising:
a. acquiring a platform, the platform comprising a proximal side, a distal side opposite the proximal side, a first lateral side adjacent to the proximal side and the distal side, a second lateral side opposite the first lateral side and adjacent to the proximal side and the distal side, a top surface and a bottom surface opposite the top surface;
b. attaching a plurality of wheels to the platform to project below the bottom surface;
c. attaching a plurality of elongated posts to the wheels so that the elongated posts project above the top surface, wherein one elongated post is attached to one wheel;
d. attaching a lift mechanism to the proximal side of the platform, the lift mechanism comprising a lift arm, a lift arm housing operatively connected to the lift arm, the lift arm housing having a top end and a bottom end opposite the top end, the lift arm configured to slide in and out of the lift arm housing at the bottom end, a horizontal bar operatively connected to the lift arm housing adjacent the bottom end, a lift device housed inside the lift arm housing, the lift device operatively connected to the lift arm, and a motor operatively connected to the lift device to cause the lift arm to slide in and out of the lift arm housing;
e. placing the item on the top surface of the platform;
f. mounting a receiver onto a structure;
g. rolling the platform to the structure;
h. inserting the horizontal bar into the receiver;
i. activating the motor to raise the platform, whereby the item is lifted, wherein a first set of wheels is attached to the platform prior to loading the item and a second set of wheels is attached to the platform after the item has been loaded on the platform.

18. The method of claim 17, wherein the first set of wheels is attached on the first lateral side prior to the item being loaded onto the platform, and wherein after the item has been loaded onto the platform, a gooseneck frame is attached to the second lateral side of the platform and a jack is used to lift platform via the gooseneck frame to permit the second set of wheels to be attached to the platform.

19. The lift system of claim 18, further comprising attaching a cross brace to the structure, wherein the cross brace comprises a first end, a second end, and a pull rod therebetween.

20. The lift system of claim 19, further comprising attaching the pull rod to the lift arm housing at a pull rod bracket by inserting a pin through the pull rod and the pull rod bracket.

21. A method of using a lift system to support an item, comprising:
a. acquiring a platform, the platform comprising a proximal side, a distal side opposite the proximal side, a first lateral side adjacent to the proximal side and the distal side, a second lateral side opposite the first lateral side and adjacent to the proximal side and the distal side, a top surface and a bottom surface opposite the top surface;
b. attaching a plurality of wheels to the platform to project below the bottom surface;
c. attaching a plurality of elongated posts to the wheels so that the elongated posts project above the top surface, wherein one elongated post is attached to one wheel;
d. attaching a lift mechanism to the proximal side of the platform, the lift mechanism comprising a lift arm, a lift arm housing operatively connected to the lift arm, the lift arm housing having a top end and a bottom end opposite the top end, the lift arm configured to slide in and out of the lift arm housing at the bottom end, a horizontal bar operatively connected to the lift arm housing adjacent the bottom end, a lift device housed inside the lift arm housing, the lift device operatively connected to the lift arm, and a motor operatively connected to the lift device to cause the lift arm to slide in and out of the lift arm housing;
e. placing the item on the top surface of the platform;
f. mounting a receiver onto a structure;
g. rolling the platform to the structure;
h. inserting the horizontal bar into the receiver; and
i. activating the motor to raise the platform, whereby the item is lifted; and further comprising the steps of
j. activating the electric motor to lower the platform, detaching the horizontal bar from the receiver, rolling the platform away from the structure, removing the item from the platform, re-orienting the platform to stand on the elongated posts to create a tabletop.

22. The lift system of claim 21, further comprising removing the wheels from the platform, removing the elongated posts from the wheels, and attaching the elongated posts directly to the platform.

\* \* \* \* \*